US012255405B2

(12) United States Patent
Zhang et al.

(10) Patent No.: US 12,255,405 B2
(45) Date of Patent: Mar. 18, 2025

(54) MULTIPATH ROBUST ANTENNA DESIGN FOR PHASE-BASED DISTANCE MEASUREMENT

(71) Applicant: Cypress Semiconductor Corporation, San Jose, CA (US)

(72) Inventors: Zhuohui Zhang, Tustin, CA (US); Kiran Uln, Pleasanton, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 18/485,320

(22) Filed: Oct. 12, 2023

(65) Prior Publication Data

US 2024/0113426 A1 Apr. 4, 2024

Related U.S. Application Data

(62) Division of application No. 17/410,293, filed on Aug. 24, 2021, now Pat. No. 11,817,633.

(51) Int. Cl.
*H01Q 3/24* (2006.01)
*H01Q 3/44* (2006.01)

(52) U.S. Cl.
CPC ............... *H01Q 3/247* (2013.01); *H01Q 3/44* (2013.01)

(58) Field of Classification Search
CPC ............ H01Q 3/24; H01Q 3/247; H01Q 3/44; H01Q 3/446; H01Q 19/32; H01Q 5/392
See application file for complete search history.

(56) References Cited

U.S. PATENT DOCUMENTS 9,379,449 B2 * 6/2016 Cetiner .................... H01Q 3/01

FOREIGN PATENT DOCUMENTS

| | | | | |
|---|---|---|---|---|
| CN | 105576356 A | * | 5/2016 | ............... H01Q 1/00 |
| CN | 212011260 U | * | 11/2020 | ............... H01Q 1/00 |
| WO | WO-2014143320 A2 | * | 9/2014 | ............... H01Q 1/38 |

* cited by examiner

*Primary Examiner* — Ankur Jain

(57) ABSTRACT

A system and method reconfiguring an antenna for reducing and/or eliminating the effects of multipath on a phase-based measurement system. The method includes steering an antenna unit into a first direction to cause the antenna unit to generate a first constant tone (CT) signal based on a plurality of multipath signals. The method includes performing a phase measurement on the first CT signal to generate a first phase measurement value. The method includes steering the antenna unit into a second direction to cause the antenna unit to generate a second CT signal based on the plurality of multipath signals. The method includes performing a phase measurement on the second CT signal to generate a second phase measurement value. The method includes determining a change in multipath interference at the antenna unit among the plurality of multipath signals. The method includes re-steering the antenna unit into the first direction.

20 Claims, 9 Drawing Sheets

300

| State (1-3) | Pin Diode 1 | Pin Diode 2 |
|---|---|---|
| 1: peak -90° (left) | OFF | ON |
| 2: peak 90° (right) | ON | OFF |
| 3: peak 0° (front) | ON | ON |

700

| State (1-6) | Pin Diode 1 | Pin Diode 2 | Pin Diode 3 | Pin Diode 4 | Pin Diode 5 |
|---|---|---|---|---|---|
| 2G peak -90° (left) | OFF | ON | OFF | OFF | ON |
| 2G peak 90° (right) | ON | OFF | OFF | OFF | ON |
| 2G peak 0° (front) | ON | ON | OFF | OFF | ON |
| 5G peak -90° (left) | OFF | OFF | OFF | ON | OFF |
| 5G peak 90° (right) | OFF | OFF | ON | OFF | OFF |
| 5G peak 0° (front) | OFF | OFF | ON | ON | OFF |

1000

MULTIPATH ROBUST ANTENNA DESIGN FOR PHASE-BASED DISTANCE MEASUREMENT

This application is a Divisional of U.S. Non-Provisional application Ser. No. 17/410,293, filed Aug. 24, 2021, which is incorporated by reference herein in their entirety. The present disclosure relates generally to the field of antenna design, and more particularly, to a reconfigurable antenna design for reducing and/or eliminating the effects of multipath on a phase-based measurement system.

TECHNICAL FIELD

Background

Narrow-band radios such as Bluetooth Low Energy (LE) or IEEE 802.15.4 radios may determine the distance between devices within sub-meter accuracy. One of the solutions to provide an accurate distance measurement is multi-carrier phase-based ranging, in which the two-way phase-difference between two devices is measured over multi-carriers.

BRIEF DESCRIPTION OF THE DRAWINGS

The present disclosure is illustrated by way of example, and not by way of limitation, in the figures of the accompanying drawings in which like reference numerals refer to similar elements and in which.

DETAILED DESCRIPTION

Figure 1:
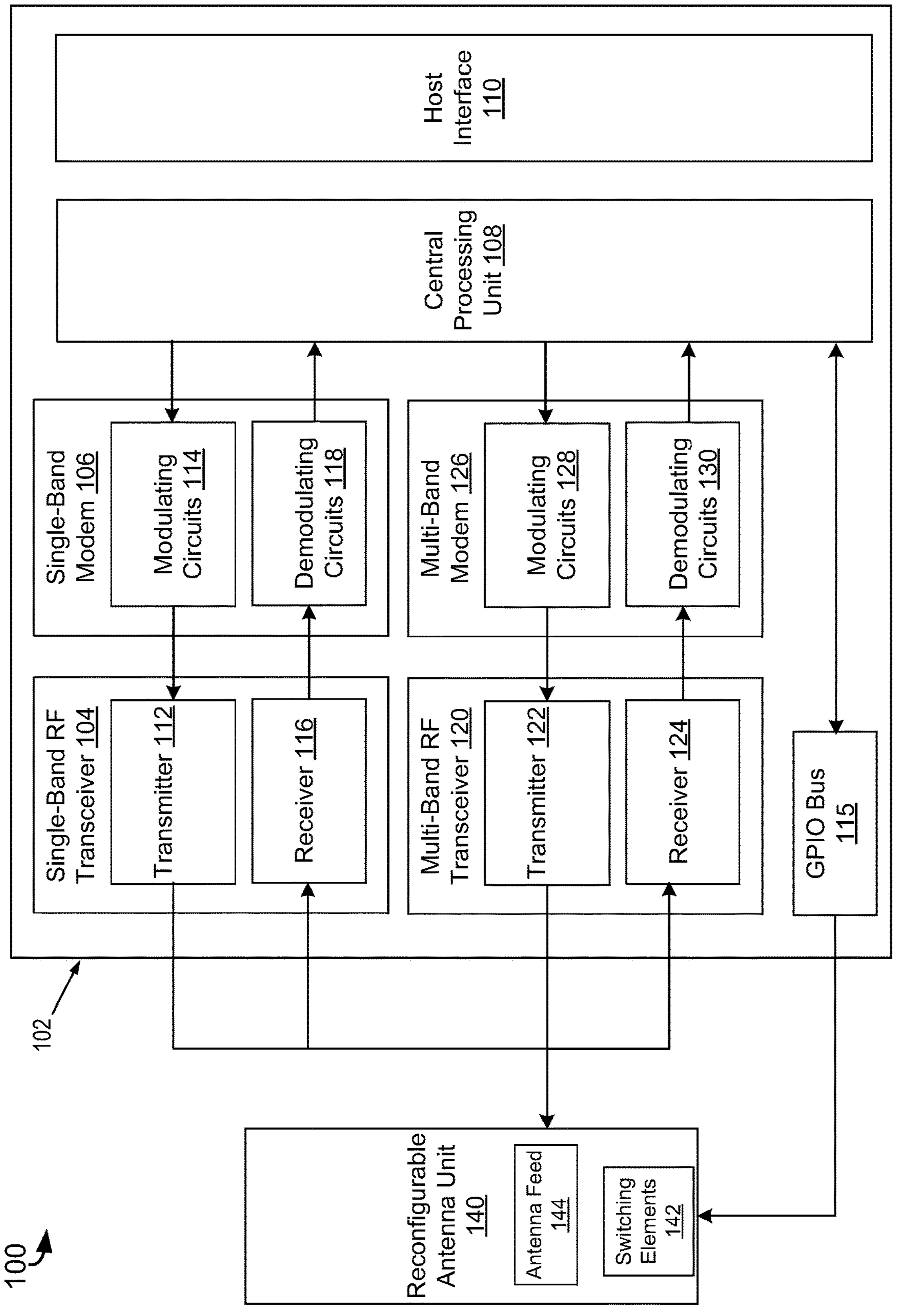
FIG. 1 illustrates a block diagram of an example communication system for the transmission and reception of single-band or multi-band wireless signals, according to some embodiments.

The following description sets forth numerous specific details such as examples of specific systems, components, methods, and so forth, in order to provide a good understanding of various embodiments of the techniques described herein for an efficient secure phase-based ranging using loopback calibration. It will be apparent to one skilled in the art, however, that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the scope of the present disclosure.

Locationing in technologies like Bluetooth (BT) and wireless local area network (WLAN) is adding high accuracy distance measurements (HADM), such as phase based measurements which involves measuring relative phases of single-tone or constant tone (CT) transmissions across the available bandwidth.

However, multipath interference (sometimes simply referred to as, "multipath") or fading causes challenges for the conventional systems to estimate distance/location from these phase measurements. That is, complex estimation algorithms such as Multi Signal Classification (MUSIC) may be used to perform these estimations, but these algorithms require multiple antennas to improve robustness and accuracy. Using multiple antennas, however, comes with the requirement that the antennas must be identical and that there is a minimum separation between the antennas, which produces a larger footprint for the antenna array. As such, these restrictions may negatively impact the telecommunication infrastructure in that they consume greater resources (e.g., networking components, networking congestion, real estate), while limiting the number of options available to a networking administrator to improve efficiency of the telecommunication infrastructure.

Aspects of the disclosure address the above-noted and other deficiencies by disclosing a reconfigurable single-antenna design for reducing and/or eliminating the effects of multipath interference on a phase-based measurement system. As described in the below passages, the reconfigurable antenna includes switched elements to add the capability of re-configuring the antenna in the BT and WLAN spectrum. The antenna patterns (sometimes referred to as, "radiation patterns") of the antenna, which indicate the radiation properties of the antenna as a function of space, may be changed to view different perspectives of the incoming signal. The antenna can be switched in a time-division multiple access (TDMA) fashion by a modem or central processing unit within the tone/frequency using existing techniques for phase based measurements; thereby allowing the antenna to provide antenna measurements in several perspectives for determining the optimal perspective for reducing and/or eliminating the effects of multipath interference on a phase-based measurement system.

FIG. 1 illustrates a block diagram of an example communication system for the transmission and reception of single-band or multi-band wireless signals, according to some embodiments. The communication system 100 includes a communication device 102 and a reconfigurable antenna unit 140 (sometimes referred to as, antenna unit 140). The communication device 102 includes a single-band radio frequency (RF) transceiver 104, a single-band modem 106, a multi-band RF transceiver 120, a multi-band modem 126, a central processing unit (CPU 108), such as a Microprocessor and Memory Unit, a general purpose input/output (GPIO) bus 150, and one or more host interfaces 110 thru which the communication system communicates with a host computer or device (not shown in FIG. 1).

The single-band RF transceiver 104 includes a transmitter 112 configured to transmit signals provided by a modulating circuit 114 in the single-band modem 106 and a receiver 116 that is configured to receive modulated signals and provide the modulated signals to demodulating circuit 118 in the single-band modem 106 for processing. In some embodiments, the single-band RF transceiver 104 may be a Bluetooth (BT) radio that is configured to support the transmission/reception of RF signals in the 2.4 gigahertz (GHz) industrial, scientific, and medical (ISM) frequency band, and the single-band modem 106 may be a BT modem that is configured to process the corresponding signals. In some embodiments, the 2.4 GHz ISM band may include a frequency range from 2.4 GHz to 2.5 GHz.

The multi-band RF transceiver 120 includes a transmitter 122 configured to transmit signals provided by a modulating circuit 128 in the multi-band modem 126 and a receiver 124 that is configured to receive modulated signals and provide the modulated signals to demodulating circuit 130 in the multi-band modem 126 for processing. In some embodiments, the multi-band RF transceiver 120 may be a wireless local area network (WLAN) radio (sometimes referred to as, wireless fidelity (Wi-Fi)) that is configured to support the transmission/reception of RF signals in the 2.4 GHz ISM band and/or the 5.8 GHz ISM frequency band, and the multi-band modem 126 may be a WLAN modem that is configured to process the corresponding signals. In some embodiments, the 5.8 GHz ISM band may include a frequency range from 5.725 GHz to 5.875 GHz.

In some embodiments, the communication system 100 may include a number of band pass filters, amplifiers and analog-to-digital converters (ADCs) and digital-to-analog converters (DACs) within and through which signals are passed between the antenna unit 140 and components of the communication device 102.

In some embodiments, components of the communication device 102 and the antenna unit 140 are integrally formed (e.g., deposed) or incorporated on a single integrated circuit (IC) chip. In some embodiments, components of the antenna unit 140 are integrally formed on separate IC chips. In some embodiments, the components of the communication device 102 and the antenna unit 140 may be mounted (e.g., attached) to the same or different printed circuit boards (PCBs) or substrates.

As shown in FIG. 1, the antenna unit 140 may include a plurality of switching elements 142 and an antenna feed 144 (e.g., a conductor). In some embodiments, a switching element 142 may include a three-terminal diode, a three-terminal pin diode, or a varactor. The antenna feed 144 of the antenna unit 140 may be coupled to an output of transmitter 112, an input of receiver 116, an output of transmitter 122, and/or an input of receiver 124. The GPIO bus 115, which includes a plurality of ports or channels, may be coupled to the switching elements 142 of the antenna unit 140. In some embodiments, the CPU 108 is coupled to and configured to control the GPIO bus 115.

Figure 2:
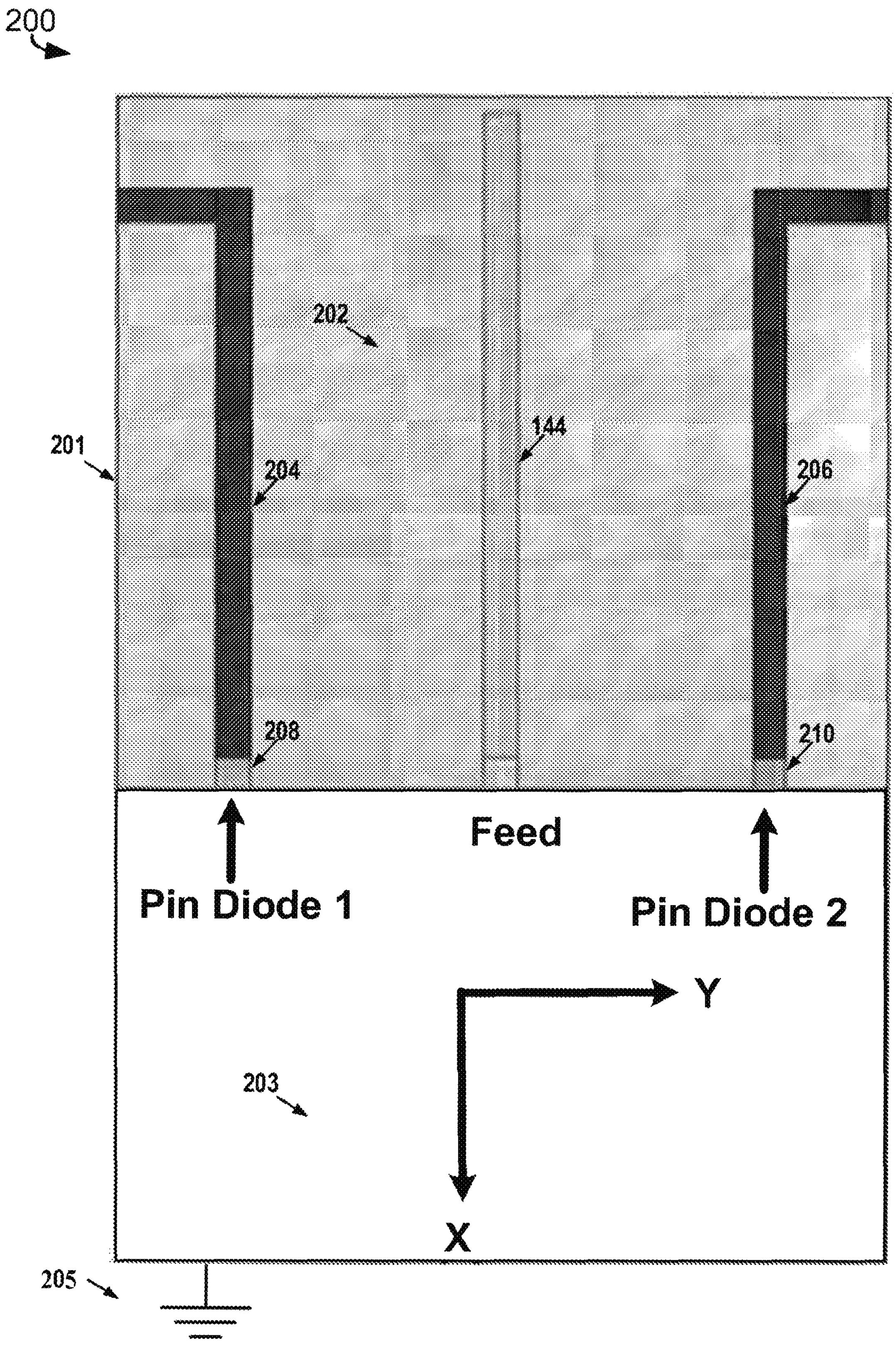
FIG. 2 illustrates a block diagram of an example reconfigurable antenna for the transmission and reception of single-band wireless signals, according to some embodiments.

FIG. 2 illustrates a block diagram of an example antenna unit for the transmission and reception of single-band wireless signals, according to some embodiments. In some embodiments, the antenna unit 200 may be antenna unit 140 in FIG. 1. In some embodiments, the antenna unit 200 is configured for the transmission/reception of RF signals in the 2.4 GHz ISM band (e.g., for Bluetooth applications).

In some embodiments, the antenna unit 200 is attached to a substrate 201 that includes a first region 202 and a second region 203, where the second region 203 is coupled to a ground plane (e.g., as indicated by ground symbol 205). In some embodiments, the first region 202 includes a parasitic element 204 and a parasitic element 206. In some embodiments, the first region 202 includes only one antenna feed (e.g., antenna feed 144), which is positioned between the parasitic element 204 and the parasitic element 206. In some embodiments, the first region 202 includes a switching element 208 and switching element 210 (e.g., switching elements 142 in FIG. 1). In some embodiments, the second region 203 includes a plurality of channels (not shown in FIG. 2), such that one or more terminals of the switching elements and the antenna feed 144 may be coupled to the communication device 102.

In some embodiments, a first terminal of the antenna feed 144 is coupled to one or more RF terminals (e.g., the output of transmitter 112, the input of receiver 116, the output of transmitter 122, and/or the input of receiver 124) of communication device 102.

In some embodiments, a first terminal of the parasitic element 204 is coupled to a first terminal of the switching element 208 (shown in FIG. 2 as, Pin Diode 1). In some embodiments, a second terminal of the switching element 208 is coupled to a ground plane of substrate 201 (e.g., as indicated by ground symbol 205). In some embodiments, a control terminal of the switching element 208 is coupled to a first channel of the GPIO bus 115.

In some embodiments, a first terminal of the parasitic element 206 is coupled to a first terminal of the switching element 210 (shown in FIG. 2 as, Pin Diode 2). In some embodiments, a second terminal of the switching element 210 is coupled to a ground plane of substrate 201 (e.g., as indicated by ground symbol 205). In some embodiments, a control terminal of the switching element 210 is coupled to a second channel of the GPIO bus 115. In some embodiments, the communication device 102 may configure (e.g., toggle) a switching element via the GPIO bus 115.

Figures 3, 4:
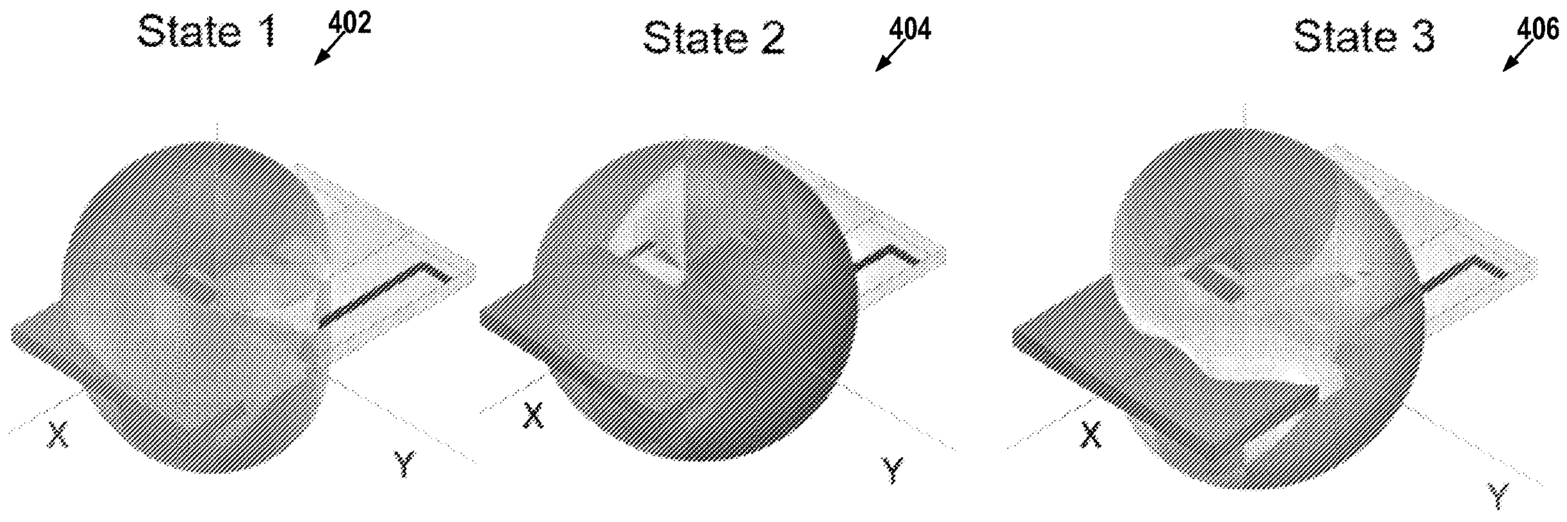
FIG. 3 illustrates a control table of example antenna states for the antenna unit 200, according to some embodiments.
FIG. 4 illustrates the radiation patterns of the antenna unit 200 corresponding to States 1-3 in FIG. 3, according to some embodiments.

FIG. 3 illustrates a control table of example antenna states for the antenna unit 200, according to some embodiments. The control table 300 shows that the antenna unit 200 may be configured into three different antenna states by configuring Pin Diode 1 (switching element 208 in FIG. 2) and Pin Diode 2 (switching element 208 in FIG. 210). In some embodiments, the communication device 102 may configure the antenna unit 200 into State 1 by disabling (e.g., deactivating, turning off) the switching element 208 and enabling (e.g., activating, turning on) the switching element 210. In some embodiments, State 1 is where the antenna unit 200 is directed (e.g., leaning) toward a left direction, such that the peak gain of the antenna unit 200 is at or near −90 degrees.

In some embodiments, the communication device 102 may configure the antenna unit 200 into State 2 by enabling the switching element 208 and disabling the switching element 210. In some embodiments, State 2 is where the antenna unit 200 is directed toward a right direction, such that the peak gain of the antenna unit 200 is at or near 90 degrees.

In some embodiments, the communication device 102 may configure the antenna unit 200 into State 3 by enabling the switching element 208 and enabling the switching element 210. In some embodiments, State 3 is where the antenna unit 200 is directed toward a forward direction, such that the peak gain of the antenna unit 200 is at or near 0 degrees.

In some embodiments, the communication device 102 may disable a switching element (e.g., switching element 208, switching element 210) by driving the channel of the GPIO bus 115 that is coupled to the control terminal of the switching element to a LOW voltage level (e.g., a negative power rail, ground). In some embodiments, the communication device 102 may enable a switching element (e.g., switching element 208, switching element 210) by driving the channel of the GPIO bus 115 that is coupled to the control terminal of the switching element to a HIGH voltage level (e.g., positive power rail).

FIG. 4 illustrates the radiation patterns of the antenna unit 200 corresponding to States 1-3 in FIG. 3, according to some embodiments. As shown, radiation patterns 402, 404, 406 are each plotted on an XY-plane in the horizontal direction and a Z-plane in the vertical direction, and each shows the directions that the antenna unit 200 radiates power into or from the surrounding space.

When the antenna unit 200 is configured in State 1, the antenna unit 200 exhibits the radiation pattern 402, such that antenna unit 200 is directed toward a left direction and has a peak gain at or near −90 degrees. When the antenna unit 200 is configured in State 2, the antenna unit 200 exhibits the radiation pattern 404, such that antenna unit 200 is directed toward a right direction and has a peak gain at or near 90 degrees. When the antenna unit 200 is configured in State 3, the antenna unit 200 exhibits the radiation pattern 406, such that antenna unit 200 is directed toward a front direction and has a peak gain at or near 0 degrees.

Figure 5:
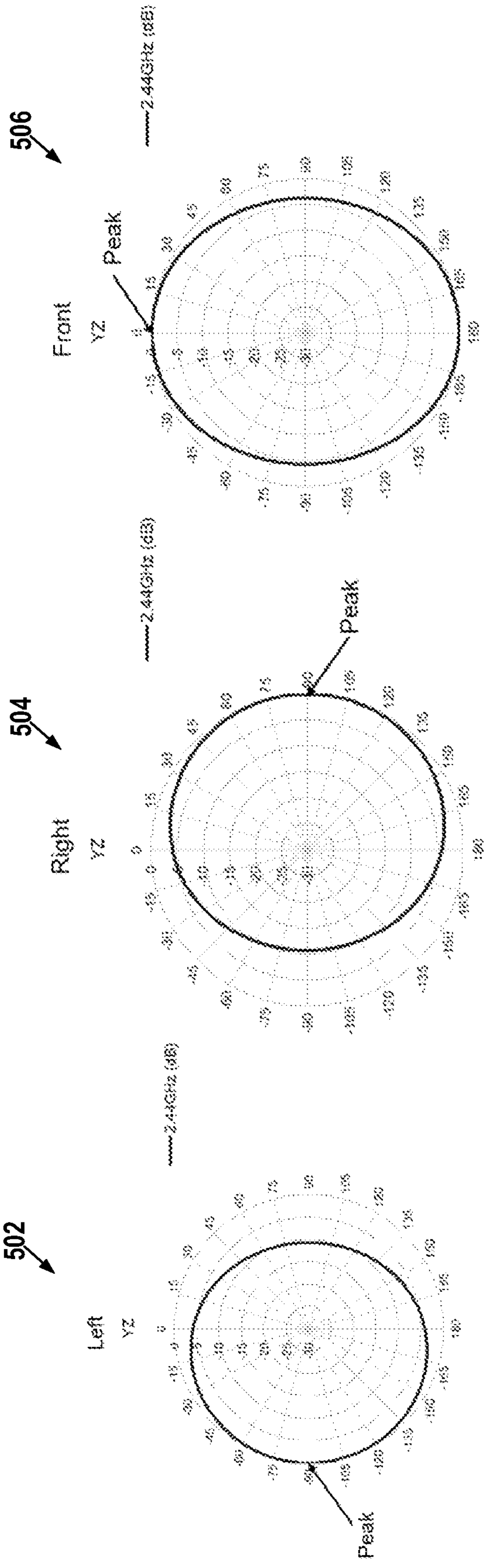
FIG. 5 illustrates antenna azimuth charts showing the radiation patterns of the antenna unit 200 corresponding to States 1-3 in FIG. 3, according to some embodiments.

FIG. 5 illustrates antenna azimuth charts showing the radiation patterns of the antenna unit 200 corresponding to States 1-3 in FIG. 3, according to some embodiments. Each of the radiation patterns 502, 504, 506 show the loss or gain in radiated power into or from the surrounding space as provided by the antenna unit 200 for a 360-degree sweep around the antenna unit 200. When the antenna unit 200 is configured in State 1, the antenna unit 200 exhibits the radiation pattern 502 in the 2.4 GHz ISM band, such that antenna unit 200 is directed toward a left direction and has a peak gain at or near −90 degrees. When the antenna unit 200 is configured in State 2, the antenna unit 200 exhibits the radiation pattern 504 in the 2.4 GHz ISM band, such that antenna unit 200 is directed toward a right direction and has a peak gain at or near 90 degrees. When the antenna unit 200 is configured in State 3, the antenna unit 200 exhibits the radiation pattern 506 in the 2.4 GHz ISM band, such that antenna unit 200 is directed toward a front direction and has a peak gain at or near 0 degrees.

Figure 6:
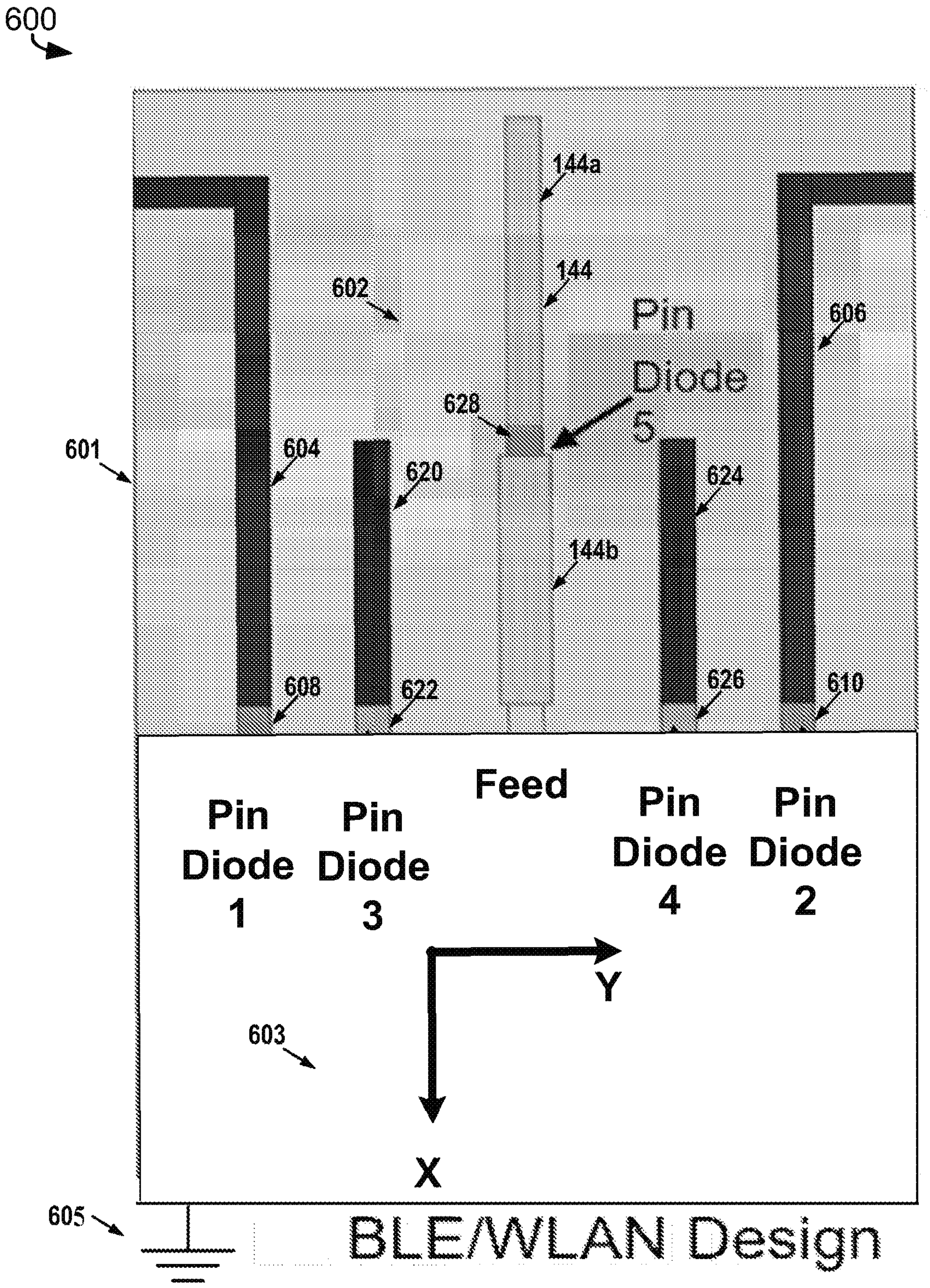
FIG. 6 illustrates a block diagram of an example antenna unit for the transmission and reception of multi-band wireless signals, according to some embodiments.

FIG. 6 illustrates a block diagram of an example antenna unit for the transmission and reception of multi-band wireless signals, according to some embodiments. In some embodiments, the antenna unit 600 may be antenna unit 140 in FIG. 1. In some embodiments, the antenna unit 600 is configured for the transmission/reception of RF signals in the 2.4 GHz ISM band (e.g., for Bluetooth applications) and the 5.8 GHz ISM frequency band (e.g., WLAN applications).

In some embodiments, the antenna unit 600 is attached to a substrate 601 that includes a first region 602 and a second region 603, where the second region 603 is coupled to a ground plane (e.g., as indicated by ground symbol 605). In some embodiments, the first region 602 includes a parasitic element 604, a parasitic element 606, a parasitic element 620, and a parasitic element 624. In some embodiments, the first region 602 includes only one antenna feed (e.g., antenna feed 144), which is positioned between the parasitic element 620 and the parasitic element 624. In some embodiments, the first region 602 includes a switching element 608, a switching element 622, a switching element 628, a switching element 626, and a switching element 610 (e.g., switching elements 142 in FIG. 1). In some embodiments, the second region 603 includes a plurality of channels (not shown in FIG. 6), such that one or more terminals of the switching elements and the antenna feed 144 may be coupled to the communication device 102.

In some embodiments, the antenna feed 144 includes an antenna portion 144*a* and an antenna portion 144*b*. In some embodiments, a first terminal of the antenna portion 144*a* is coupled to one or more RF terminals (e.g., the output of transmitter 112, the input of receiver 116, the output of transmitter 122, and/or the input of receiver 124) of communication device 102. In some embodiments, a second terminal of the antenna portion 144*a* is coupled to a first terminal of switching element 628 (shown in FIG. 6 as, Pin Diode 5), whose second terminal is coupled to a first terminal of antenna portions 144*a*.

In some embodiments, a first terminal of the parasitic element 604 is coupled to a first terminal of the switching element 608 (shown in FIG. 6 as, Pin Diode 1). In some embodiments, a second terminal of the switching element 608 is coupled to a ground plane of substrate 601 (e.g., as indicated by ground symbol 605). In some embodiments, a control terminal of the switching element 608 is coupled to a first channel of the GPIO bus 115.

In some embodiments, a first terminal of the parasitic element 606 is coupled to a first terminal of the switching element 610 (shown in FIG. 6 as, Pin Diode 2). In some embodiments, a second terminal of the switching element 610 is coupled to a ground plane of substrate 601 (e.g., as indicated by ground symbol 605). In some embodiments, a control terminal of the switching element 610 is coupled to a second channel of the GPIO bus 115.

In some embodiments, a first terminal of the parasitic element 620 is coupled to a first terminal of the switching element 622 (shown in FIG. 6 as, Pin Diode 3). In some embodiments, a second terminal of the switching element 622 is coupled to a ground plane of substrate 601 (e.g., as indicated by ground symbol 605). In some embodiments, a control terminal of the switching element 622 is coupled to a second channel of the GPIO bus 115.

In some embodiments, a first terminal of the parasitic element 624 is coupled to a first terminal of the switching element 626 (shown in FIG. 6 as, Pin Diode 4). In some embodiments, a second terminal of the switching element 626 is coupled to a ground plane of substrate 601 (e.g., as indicated by ground symbol 605). In some embodiments, a control terminal of the switching element 626 is coupled to a second channel of the GPIO bus 115. In some embodiments, the communication device 102 may configure (e.g., toggle) a switching element via the GPIO bus 115.

Figures 7, 8:
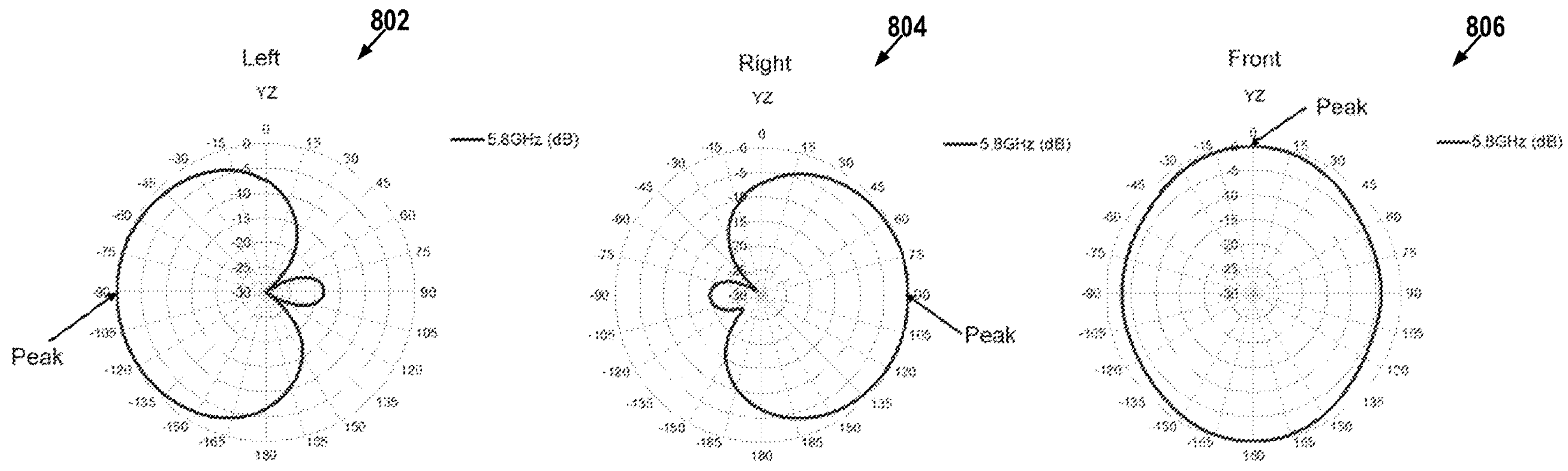
FIG. 7 illustrates a control table of example antenna states for the antenna unit 600, according to some embodiments.
FIG. 8 illustrates antenna azimuth charts showing the radiation patterns of the antenna unit 600 corresponding to States 4-6 in FIG. 7, according to some embodiments.

FIG. 7 illustrates a control table of example antenna states for the antenna unit 600, according to some embodiments. The control table 700 shows that the antenna unit 600 may be configured into three different antenna states for operating within the 2.4 GHz ISM band by configuring Pin Diode 1 (switching element 608 in FIG. 6), Pin Diode 2 (switching element 610 in FIG. 6), Pin Diode 3 (switching element 622 in FIG. 6), Pin Diode 4 (switching element 626 in FIG. 6), and Pin Diode 5 (switching element 628 in FIG. 6).

In some embodiments, the communication device 102 may configure the antenna unit 600 into State 1 by disabling the switching element 608, enabling the switching element 610, disabling the switching element 622, disabling the switching element 626, and enabling the switching element 628. In some embodiments, State 1 is where the antenna unit 600 is configured to operate within the 2.4 GHz ISM band and is directed toward a left direction, such that the peak gain of the antenna unit 600 is at or near −90 degrees.

In some embodiments, the communication device 102 may configure the antenna unit 600 into State 2 by enabling the switching element 608, disabling the switching element 610, disabling the switching element 622, disabling the switching element 626, and enabling the switching element 628. In some embodiments, State 2 is where the antenna unit 600 is configured to operate within the 2.4 GHz ISM band and is directed toward a right direction, such that the peak gain of the antenna unit 600 is at or near 90 degrees.

In some embodiments, the communication device 102 may configure the antenna unit 600 into State 3 by enabling the switching element 608, enabling the switching element 610, disabling the switching element 622, disabling the switching element 626, and enabling the switching element 628. In some embodiments, State 3 is where the antenna unit 600 is configured to operate within the 2.4 GHz ISM band and is directed toward a front direction, such that the peak gain of the antenna unit 600 is at or near 0 degrees.

In some embodiments, the communication device 102 may configure the antenna unit 600 into State 4 by disabling the switching element 608, disabling the switching element 610, disabling the switching element 622, enabling the switching element 626, and disabling the switching element 628. In some embodiments, State 4 is where the antenna unit 600 is configured to operate within the 5.8 GHz ISM band and is directed toward a left direction, such that the peak gain of the antenna unit 600 is at or near −90 degrees.

In some embodiments, the communication device 102 may configure the antenna unit 600 into State 5 by disabling the switching element 608, disabling the switching element 610, enabling the switching element 622, disabling the switching element 626, and disabling the switching element 628. In some embodiments, State 5 is where the antenna unit 600 is configured to operate within the 5.8 GHz ISM band and is directed toward a right direction, such that the peak gain of the antenna unit 600 is at or near 90 degrees.

In some embodiments, the communication device 102 may configure the antenna unit 600 into State 6 by disabling the switching element 608, disabling the switching element 610, enabling the switching element 622, enabling the switching element 626, and disabling the switching element 628. In some embodiments, State 6 is where the antenna unit 600 is configured to operate within the 5.8 GHz ISM band and is directed toward a front direction, such that the peak gain of the antenna unit 600 is at or near 0 degrees.

FIG. 8 illustrates antenna azimuth charts showing the radiation patterns of the antenna unit 600 corresponding to States 4-6 in FIG. 7, according to some embodiments. Each of the radiation patterns 802, 804, 806 show the loss or gain in radiated power into or from the surrounding space as provided by the antenna unit 600 for a 360-degree sweep around the antenna unit 600. When the antenna unit 600 is configured in State 4, the antenna unit 600 exhibits the radiation pattern 802 in the 5.8 GHz ISM band, such that antenna unit 600 is directed toward a left direction and has a peak gain at or near −90 degrees. When the antenna unit 600 is configured in State 5, the antenna unit 600 exhibits the radiation pattern 804 in the 5.8 GHz ISM band, such that antenna unit 600 is directed toward a right direction and has a peak gain at or near 90 degrees. When the antenna unit 600 is configured in State 6, the antenna unit 600 exhibits the radiation pattern 806 in the 5.8 GHz ISM band, such that antenna unit 600 is directed toward a front direction and has a peak gain at or near 0 degrees.

Referring back to FIGS. 1, 2, and 6, the communication device 102, in some embodiments, may be configured to steer (e.g., direct) an antenna unit (e.g., antenna unit 200, antenna unit 600) into a first direction to cause the antenna unit to generate a first constant tone (CT) signal based on a plurality of multipath signals. In some embodiments, the antenna unit includes a single antenna feed (e.g., antenna feed 144) and a plurality of parasitic elements (e.g., parasitic elements 204, 206, 604, 620, 624, 606). In some embodiments, the communication device 102 may be configured to perform a phase measurement (e.g., phase variation, phase noise) on the first CT signal to generate a first phase measurement. In some embodiments, the communication device 102 may be configured to determine a distance (e.g., range) to another communication device that is responsible for transmitting the plurality of multipath signals, wherein the communication device 102 determines the distance based on the first phase measurement.

In some embodiments, the communication device 102 may be configured to steer the antenna unit into a second direction to cause the antenna unit to generate a second CT signal based on the plurality of multipath signals. In some embodiments, the communication device 102 may be configured to perform a phase measurement on the second CT signal to generate a second phase measurement. In some embodiments, the communication device 102 may be configured to determine a distance to another communication device that is responsible for transmitting the plurality of multipath signals, wherein the communication device 102 determines the distance based on the second phase measurement. In some embodiments, the communication device 102 may be configured to determine, based on the first phase measurement and the second phase measurement, a change in multipath interference at the antenna unit among the plurality of multipath signals. In some embodiments, the communication device 102 may be configured to re-steer, responsive to determining the change in multipath interference, the antenna unit into the first direction.

In some embodiments, the communication device 102 may be configured to determine that the change in multipath interference at the antenna unit among the plurality of multipath signals indicates that the antenna unit steered into the first direction produced a greater reduction in the multipath interference than the antenna unit steered into the second direction. In some embodiments, the antenna unit generates the first CT signal by receiving a main signal of the plurality of multipath signals from the first direction using a first gain state of the antenna unit and receiving a reflected signal of the plurality of multipath signals from the second direction using a second gain state of the antenna unit.

In some embodiments, the communication device 102 may be configured to determine an angle of arrival associated with the main signal based on the first CT signal and the second CT signal. In some embodiments, the communication device 102 may be configured to determine an angle of arrival associated with the reflected signal based on the first CT signal and the second CT signal. In some embodiments, the communication device 102 steers the antenna unit into the first direction by configuring a first parasitic element of the plurality of parasitic elements into a first state or a second state; and configuring, by the communication device, a second parasitic element of the plurality of parasitic elements into the first state or the second state. In some embodiments, the communication device 102 steers the antenna unit into the second direction by configuring at least one of the first parasitic element of the plurality of parasitic elements into an opposite state of the first parasitic element, or the second parasitic element of the plurality of parasitic elements into an opposite state of the second parasitic element.

In some embodiments, the communication device 102 may be configured to couple the first parasitic element to the antenna feed to configure the first parasitic element of the plurality of parasitic elements into the first state. In some embodiments, the communication device 102 may be configured to de-couple the first parasitic element from the antenna feed to configure the first parasitic element of the plurality of parasitic elements into the second state. In some embodiments, the communication device 102 may be configured to couple the second parasitic element to the antenna feed to configure the second parasitic element of the plurality of parasitic elements into the first state. In some embodiments, the communication device 102 may be configured to de-couple the second parasitic element from the antenna feed to configure the second parasitic element of the plurality of parasitic elements into the second state.

In some embodiments, the communication device 102 may be configured to direct a peak gain of the antenna toward the first direction. In some embodiments, the communication device 102 may be configured to direct the peak gain of the antenna toward the second direction.

In some embodiments, the communication device may be configured to tune the antenna to a first frequency band (e.g., 2.4 GHz, 5.8 GHz) by toggling the switching element to couple the first portion of the antenna feed to the second portion of the antenna feed. In some embodiments, the communication device 102 may be configured to tune the antenna to a second frequency band by toggling the switching element to de-couple the first portion of the antenna feed from the second portion of the antenna feed.

Figure 9:
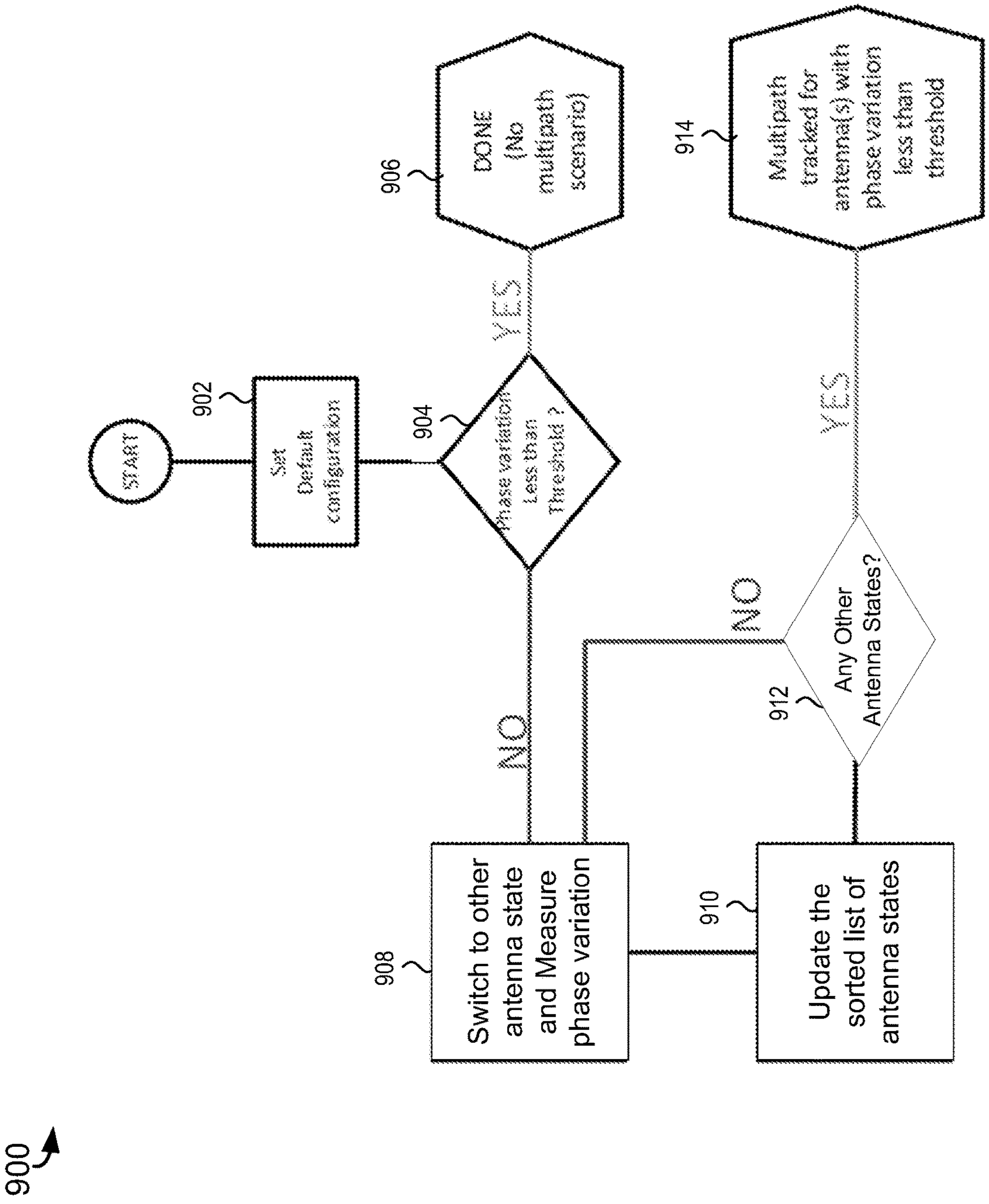
FIG. 9 is a flow diagram of a method for steering an antenna unit (e.g., antenna unit 200 in FIG. 2, antenna unit 600 in FIG. 6) to reduce the effects of multipath interference, according to some embodiments.

In some embodiments, steering the antenna unit into the first direction causes the antenna unit to generate a plurality of CT signals that are each associated with a respective frequency within a frequency band based on the plurality of multipath signals. In some embodiments, the communication device 102 may be configured to perform a phase measurement for each of the CT signals of the plurality of CT signals to generate a plurality of phase measurements. In some embodiments, the communication device 102 may be configured to poll (e.g., perform phase measurements) the same frequency, but using different antenna states for each of the phase measurements. For example, the first CT signal and the second CT signal may both be associated with the same frequency within a frequency band FIG. 9 is a flow diagram of a method for steering an antenna unit (e.g., antenna unit 200 in FIG. 2, antenna unit 600 in FIG. 6) to reduce the effects of multipath interference, according to some embodiments. That is, the communication device 102 may implement the method 900 to determine the optimal state (e.g., state 1, state 2, etc.) for an antenna unit (e.g., antenna unit 200 in FIG. 2, antenna unit 600 in FIG. 6) to reduce the effects of multipath interference during a particular timeslot.

At operation 902, in some embodiments, the communication device 102 sets (e.g., initializes) a default configuration (e.g., an antenna state) for the antenna unit. At operation 904, in some embodiments, the communication device 102 performs a phase measurement (e.g., phase variation, phase noise) on a constant tone (CT) signal to generate a phase measurement, and determines whether the phase measurement is less than a predetermined threshold. If the phase measurement is less than a predetermined threshold, then the communication device 102 proceeds to operation 906, where the communication device 102 determines that there is no (or negligible) multipath interference. If the phase measurement is not less than a predetermined threshold, then the communication device 102 proceeds to operation 908.

At operation 908, in some embodiments, the communication device 102 switches (e.g., configures) to another antenna state and performs a phase measurement on the new CT signal to generate a new phase measurement. At operation 910, in some embodiments, the communication device 102 updates the sorted list of antenna states. In some embodiments, the communication device 102 determines that a small phase measurement (e.g., smaller phase variation) produces a greater reduction in multipath interference compared to a large phase measurement.

At operation 912, in some embodiments, the communication device 102 determines if there are any other antenna states that are supported by the antenna unit. If yes, then the communication device 102 proceeds to operation 908 to repeat operations 908-912; otherwise, the communication device 102 proceeds to operation 914.

At operation 914, in some embodiments, the communication device 102 tracks the multipath interference for one or more antennas with phase variation that is less than a predetermined threshold.

Figure 10:
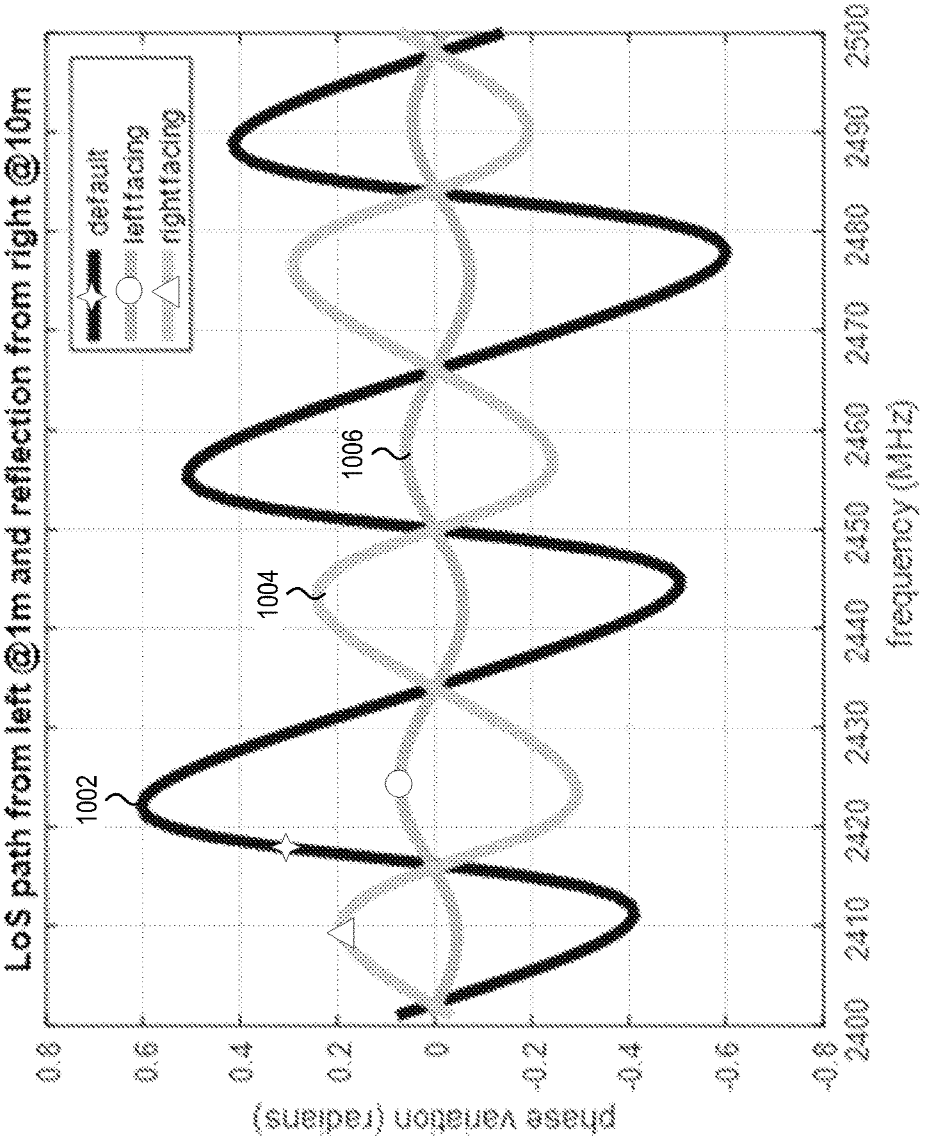
FIG. 10 is a graph illustrating the phase variation of a resultant CT signal produced by an antenna unit implementing the method 900 in FIG. 9, according to some embodiments.

FIG. 10 is a graph illustrating the phase variation of a resultant CT signal produced by an antenna unit implementing the method 900 in FIG. 9, according to some embodiments. The graph 1000 includes a curve 1002 that indicates the phase variation for a resultant wave generated by an antenna unit (e.g., antenna unit 200 in FIG. 2, antenna unit 600 in FIG. 6) that is facing in the front (referred to in FIG. 9 as, a default configuration) direction. The graph 1000 includes a curve 1004 that indicates the phase variation for a resultant wave generated by the antenna unit that is facing in the right direction. The graph 1000 includes a curve 1006 that indicates the phase variation for a resultant wave generated by the antenna unit that is facing in the left direction. By performing the method 900 in FIG. 9, the communication device 102 may determine (at operation 904) that the phase variation of a main signal (sometimes referred to as, wanted signal or primary signal) is not less than a predetermined threshold. In response, the communication device 102 may sort (at operation 910) the list of antenna states that are associated with the antenna unit (e.g., left, right, and main), and determine (at operation 914) to track the signals arriving from the left and the right, but ignore the signal arriving from the front because the resultant wave generated by the antenna unit 600 that is facing in the front direction had the highest phase variation as compared to when the antenna unit 600 is facing in the left and right direction. Therefore, by tracking the signals arriving from the left and right and ignoring the signals arriving in the front, the communication device 102 is able to reduce and/or eliminate the effects of multipath interference on a phase-based measurement system.

Figure 11:
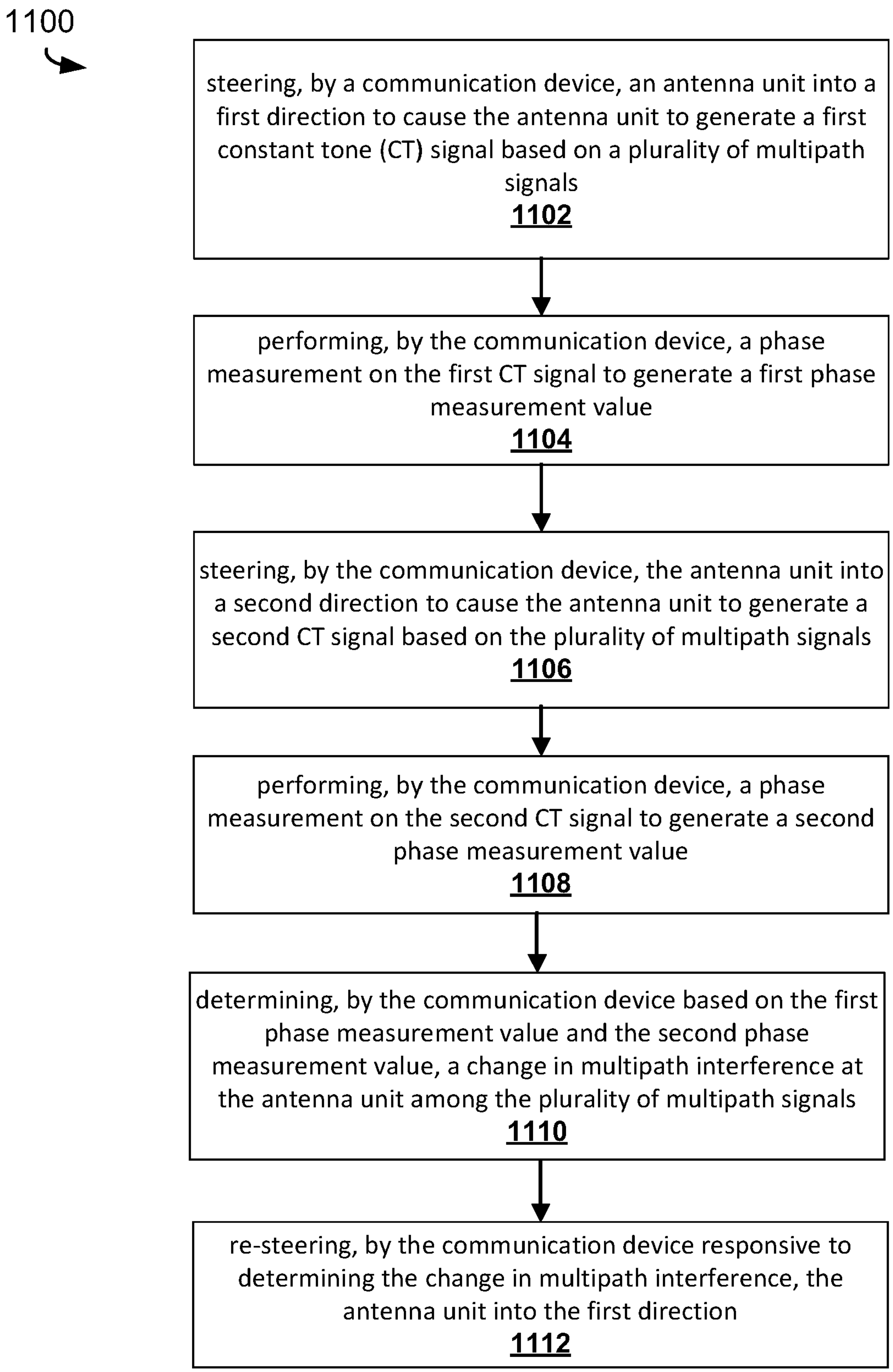
FIG. 11 is a flow diagram of a method of reconfiguring an antenna for reducing and/or eliminating the effects of multipath interference on a phase-based measurement system, according to some embodiments.

FIG. 11 is a flow diagram of a method of reconfiguring an antenna for reducing and/or eliminating the effects of multipath on a phase-based measurement system, according to some embodiments. Although the operations are depicted in FIG. 1 as integral operations in a particular order for purposes of illustration, in other implementations, one or more operations, or portions thereof, are performed in a different order, or overlapping in time, in series or parallel, or are omitted, or one or more additional operations are added, or the method is changed in some combination of ways. In some embodiments, the method 1100 may be performed by processing logic that comprises hardware (e.g., circuitry, dedicated logic, programmable logic, microcode, etc.), firmware, or a combination thereof. In some embodiments, some or all operations of method 1100 may be performed by processing logic (e.g., central processing unit 108, single-band modem 106, multi-band modem 126 in FIG. 1) in communication device 102 in FIG. 1 and on any component of the communication system 100 in FIG. 1 (e.g., antenna unit 140) and/or any other component (e.g., antenna unit 200 in FIG. 2, antenna unit 600 in FIG. 6).

The method of 1100, in some embodiments, may include the operation 1102 of steering an antenna unit into a first direction to cause the antenna unit to generate a first constant tone (CT) signal based on a plurality of multipath signals. The method of 1100, in some embodiments, may include the operation 1104 of performing a phase measurement on the first CT signal to generate a first phase measurement value. The method of 1100, in some embodiments, may include the operation 1106 of steering the antenna unit into a second direction to cause the antenna unit to generate a second CT signal based on the plurality of multipath signals. The method of 1100, in some embodiments, may include the operation 1108 of performing a phase measurement on the second CT signal to generate a second phase measurement value. The method of 1100, in some embodiments, may include the operation 1110 of determining, based on the first phase measurement value and the second phase measurement value, a change in multipath interference at the antenna unit among the plurality of multipath signals. The method of 1100, in some embodiments, may include the operation 1112 of re-steering, responsive to determining the change in multipath interference, the antenna unit into the first direction.

In the above description, some portions of the detailed description are presented in terms of algorithms and symbolic representations of operations on analog signals and/or digital signals or data bits within a non-transitory storage medium. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment of the disclosure. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "communicating," "modifying," "measuring," "determining," "detecting," "sending," "comparing," "maintaining," "switching," "controlling," "generating," or the like, refer to the actions and processes of an integrated circuit (IC) controller, or similar electronic device, that manipulates and transforms data represented as physical (e.g., electronic) quantities within the controller's registers and memories into other data similarly represented as physical quantities within the controller memories or registers or other such information non-transitory storage medium.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Embodiments described herein may also relate to an apparatus (e.g., such as an AC-DC converter, and/or an ESD protection system/circuit) for performing the operations herein. This apparatus may be specially constructed for the required purposes, or it may comprise firmware or hardware logic selectively activated or reconfigured by the apparatus. Such firmware may be stored in a non-transitory computer-readable storage medium, such as, but not limited to, read-only memories (ROMs), random access memories (RAMs), EPROMs, EEPROMs, flash memory, or any type of media suitable for storing electronic instructions. The term "computer-readable storage medium" should be taken to include a single medium or multiple media that store one or more sets of instructions. The term "computer-readable medium" shall also be taken to include any medium that is capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The above description sets forth numerous specific details such as examples of specific systems, components, methods, and so forth, in order to provide a good understanding of several embodiments of the present disclosure. It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. An antenna unit disposed on a substrate, the antenna unit comprising:

- a plurality of channels;
- a first switching element and a second switching element;
- an antenna feed coupled to a first channel of the plurality of channels;
- a first parasitic element coupled to a first terminal of the first switching element, a second terminal of the first switching element coupled to a ground plane of the substrate, and a control terminal of the first switching element coupled to a second channel of the plurality of channels; and
- a second parasitic element coupled to a first terminal of the second switching element, a second terminal of the second switching element coupled to the ground plane of the substrate, and a control terminal of the second switching element coupled to a third channel of the plurality of channels,
  - wherein each control terminal of the first switching element and the second switching element is configured to toggle to cause the respective first terminal to couple to the respective second terminal, or the respective first terminal to decouple from the respective second terminal.

2. The antenna unit of claim 1, wherein at least one of the first switching element or the second switching element is a pin diode or a varactor.

3. The antenna unit of claim 1, wherein the first terminal of the first switching element decoupled from the second terminal of the first switching element and the first terminal of the second switching element coupled to the second terminal of the second switching element configures the antenna unit to exhibit a first radiation pattern.

4. The antenna unit of claim 3, wherein the first terminal of the first switching element coupled to the second terminal of the first switching element and the first terminal of the second switching element decoupled from the second terminal of the second switching element configures the antenna unit to exhibit a second radiation pattern different than the first radiation pattern.

5. The antenna unit of claim 4, wherein the first radiation pattern includes a peak gain in a first direction and the second radiation pattern includes a peak gain in a second direction that is at or near 180 degrees apart from the first direction.

6. The antenna unit of claim 4, wherein the first terminal of the first switching element coupled to the second terminal of the first switching element and the first terminal of the second switching element coupled to the second terminal of the second switching element configures the antenna unit to exhibit a third radiation pattern different than the first and second radiation patterns.

7. The antenna unit of claim 6, wherein the first radiation pattern includes a peak gain in a first direction, the second radiation pattern includes a peak gain in a second direction, and the third radiation pattern includes a peak gain in a third direction, wherein the first direction is at or near 90 degrees apart from the second direction and the third direction is at or near 90 degrees apart from the second direction.

8. The antenna unit of claim 1, further comprising:

- a third switching element, a fourth switching element, and a fifth switching element;
- a third parasitic element coupled to a first terminal of the third switching element, a second terminal of the third switching element coupled to the ground plane of the substrate, and a control terminal of the third switching element coupled to a fourth channel of the plurality of channels; and
- a fourth parasitic element coupled to a first terminal of the fourth switching element, a second terminal of the fourth switching element coupled to the ground plane of the substrate, and a control terminal of the fourth switching element coupled to a fifth channel of the plurality of channels, wherein
  - the antenna feed comprises a first portion and a second portion,
  - the antenna feed is coupled to the first channel of the plurality of channels via a first terminal of the first portion of the antenna feed,
  - the second terminal of the first portion of the antenna feed is coupled to a first terminal of the fifth switching element, a second terminal of the fifth switching element is coupled to a first terminal of the second portion of the antenna feed, and a control terminal of the fifth switching element is coupled to a sixth channel of the plurality of channels.

9. A system, comprising:

- an antenna unit disposed on a substrate, the antenna unit comprising:
  - a plurality of channels,
  - a first switching element and a second switching element,
  - an antenna feed coupled to a first channel of the plurality of channels,
  - a first parasitic element coupled to a first terminal of the first switching element, a second terminal of the first switching element coupled to a ground plane of the substrate, and a control terminal of the first switching element coupled to a second channel of the plurality of channels, and
  - a second parasitic element coupled to a first terminal of the second switching element, a second terminal of the second switching element coupled to the ground plane of the substrate, and a control terminal of the second switching element coupled to a third channel of the plurality of channels, wherein each control terminal of the first switching element and the second switching element is configured to toggle to cause the respective first terminal to couple to the respective second terminal, or the respective first terminal to decouple from the respective second terminal; and
- a communication device comprising a radio frequency (RF) port coupled to the antenna feed via the first channel and a communication bus coupled to the control terminal of the first switching element via the second channel and the control terminal of the second switching element via the third channel, wherein the communication device is configured to toggle the first and second switching elements.

10. The system of claim 9, wherein at least one of the first switching element or the second switching element is a pin diode or a varactor.

11. The system of claim 9, wherein the communication device is configured to drive the second channel to a first voltage and the third channel to a second voltage to configure the antenna unit to exhibit a first radiation pattern, wherein the first voltage is different than the second voltage.

12. The system of claim 11, wherein the communication device is configured to drive the second channel to the second voltage and the third channel to the first voltage to configure the antenna unit to exhibit a second radiation pattern different than the first radiation pattern.

13. The system of claim 12, wherein the first radiation pattern includes a peak gain in a first direction and the second radiation pattern includes a peak gain in a second direction that is at or near 180 degrees apart from the first direction.

14. The system of claim 12, wherein the communication device is configured to drive the second channel to the second voltage and the third channel to the second voltage to configure the antenna unit to exhibit a third radiation pattern different than the first and second radiation patterns.

15. The system of claim 14, wherein the first radiation pattern includes a peak gain in a first direction, the second radiation pattern includes a peak gain in a second direction, and the third radiation pattern includes a peak gain in a third direction, wherein the first direction is at or near 90 degrees apart from the second direction and the third direction is at or near 90 degrees apart from the second direction.

16. A method, comprising:

coupling a first terminal of a first switching element to a second terminal of the first switching element and a first terminal of a second switching element to a second terminal of the second switching element to configure an antenna unit to exhibit a first radiation pattern, wherein the antenna unit is disposed on a substrate, the first terminal of the first switching element is coupled to a first parasitic element and the second terminal of the first switching element is coupled to a ground plane of the substrate, the first terminal of the second switching element is coupled to a second parasitic element and the second terminal of the second switching element is coupled to the ground plane of the substrate; and decoupling the first terminal of the first switching element from the second terminal of the first switching element to configure to the antenna unit to exhibit a second radiation pattern different than the first radiation pattern.

17. The method of claim 16, further comprising applying a first voltage to a control terminal of the first switching element and the first voltage to a control terminal of the second switching element to configure an antenna unit to exhibit the first radiation pattern.

18. The method of claim 17, further comprising applying a second voltage to the control terminal of the first switching element and the first voltage to the control terminal of the second switching element to configure the antenna unit to exhibit the second radiation pattern, wherein the first voltage is different than the second voltage.

19. The method of claim 16, further comprising coupling the first terminal of the first switching element to the second terminal of the first switching element and decoupling the first terminal of the second switching element from the second terminal of the second switching element to configure the antenna unit to exhibit a third radiation pattern different than the first and second radiation patterns.

20. The method of claim 19, further comprising applying a first voltage to a control terminal of the first switching element and a second voltage to a control terminal of the second switching element to configure the antenna unit to exhibit the third radiation pattern, wherein the first voltage is different than the second voltage.

* * * * *